United States Patent [19]

Van Landeghem et al.

[11] 4,139,768

[45] Feb. 13, 1979

[54] IMAGING CHAMBER WITH ELECTRODE STRUCTURE

[75] Inventors: Willy K. Van Landeghem, Sint-Gillis-Waas; Daniël M. Timmerman, Mortsel; Arnold A. Willem, Moerbeke-Waas; Walter F. De Winter, 's-Gravenwezel, all of Belgium

[73] Assignee: AGFA-GEVAERT N.V., Mortsel, Belgium

[21] Appl. No.: 819,154

[22] Filed: Jul. 26, 1977

[30] Foreign Application Priority Data

Jul. 28, 1976 [GB] United Kingdom ............... 31513/76

[51] Int. Cl.[2] ........................ B41M 5/00; G03B 41/16
[52] U.S. Cl. ................................................ 250/315 A
[58] Field of Search ........................ 250/315 R, 315 A

[56] References Cited

U.S. PATENT DOCUMENTS

| | | | |
|---|---|---|---|
| 3,803,411 | 4/1974 | Riess | 250/315 A |
| 3,859,529 | 1/1975 | Proudian | 250/315 A |

*Primary Examiner*—Craig E. Church
*Attorney, Agent, or Firm*—William J. Daniel

[57] ABSTRACT

An ionographic imaging chamber, which comprises: first and second substantially planar electrodes; means supporting said electrodes in the chamber in spaced relation defining a gap therebetween; means for connecting a voltage source to said electrodes, and means enabling a dielectric charge receptor member to be introduced into said chamber and into contact with one of said electrodes, wherein said one electrode has in a non-porous surface layer for contacting said member a relief structure or configuration providing a recess or recesses capable of holding gas while a said charge receptor member is in position against said one electrode.

11 Claims, 3 Drawing Figures

IMAGING CHAMBER WITH ELECTRODE STRUCTURE

Figure 1:
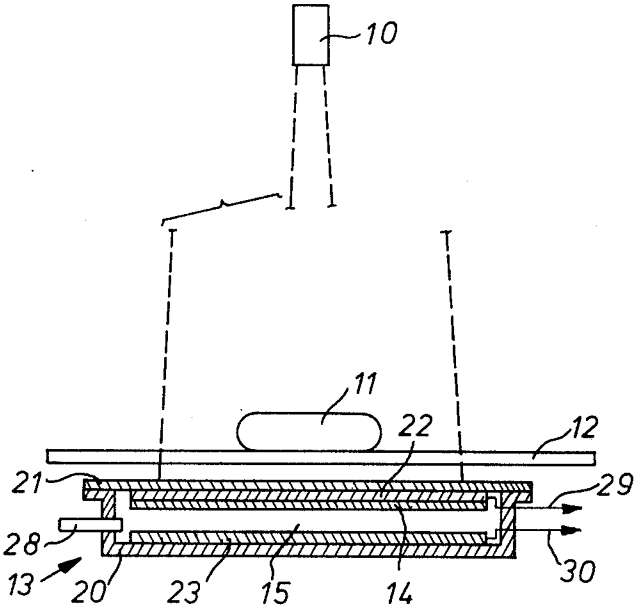

The present invention relates to an inographic imaging chamber containing an improved electrode structure to such structure and to the manufacture of said structure.

In a process of ionography as proposed by Muntz et al in U.S. Pat. No. 3,774,029 of Eric P. Muntz, Andrew P. Proudian and Paul B. Scott issued Nov. 20, 1973 use is made of the absorbing power for X-rays of a high atomic number gas e.g. xenon contained at superatmospheric pressure in an imaging chamber.

The ionizable gas stands under superatmospheric pressure to improve the X-ray absorption and to increase the production of charge carriers. The imaging chamber has a cathode and an anode located one in front of the other and which are separated by a gap in which the high atomic number gas is present. An electrically insulating receiving sheet is present in close vicinity of one of the electrodes and intercepts the image-wise formed charge carriers of a given polarity formed during X-ray absorption by the atoms of the gas. After an image-wise X-ray exposure of said gas between said electrodes having a D.C. high voltage difference, charges accumulated in image configuration on the image receiving sheet are made visible by known electrostatographic developing techniques such as, for example, immersion in a dispersion of charged toner particles in an insulating liquid.

In the inographic X-ray recording system as described in said U.S. Pat. No. 3,774,029 the radio-opaque gas is maintained in the gap typically of 8–15 mm width at superatmospheric pressure e.g. five to ten atmospheres. While the X-ray absorption under these conditions is very satisfactory the high gap width poses a problem with respect to image sharpness. The image unsharpness resulting from the high gap width between planar electrodes is called geometric image unsharpness.

The fundamental source of geometric image unsharpness in the ionographic formation of an electrostatic latent image as explained in the U.S. Pat. No. 3,859,529 of Andrew P. Proudian, Teodoro Azzarelli and Murray Samuel Welkowsky issued Jan. 7, 1975 resides in the lack of coincidence between the line along which incident X-rays create photoelectrons, and the electric field lines which accelerate those electrons to receive them on the insulating charge recepting sheet.

Said problem has been solved according to one embodiment by the use of spherically shaped electrodes as described in U.S. Pat. No. 3,828,192 of Arthur Lee Morsell issued Aug. 6, 1974 according to another embodiment by the use of electrodes that simulate a spherical electric field in the electrode gap as described in U.S. Pat. No. 3,859,529 mentioned hereinbefore.

According to the latter embodiment an ionographic imaging chamber comprises substantially planar electrodes, means for mounting said electrodes in the imaging chamber in spaced relation defining a gap therebetween; means for connecting a power supply across said electrodes; and means for maintaining along the gap between said electrodes electrostatic potentials corresponding to the electrostatic potentials for concentric spherical metal electrodes so that the electric field lines in said gap converge substantially to a point.

According to a particular embodiment both of said electrodes comprise a plurality of concentric rings. Each ring has a uniform conductivity but the conductivity of each ring varies from ring to ring to approximate the desired spherical electric field described above. Using said rings the ideal concentric spherical potential variation along the radial coordinate of the electrode is approximated in a stair-step fashion.

The rings may be made of carbon impregnated plastics e.g. thermosetting epoxy resin with acetylene black. Said materials can be cast in molds or machined to the desired thickness and their conductivity can be varied by the loading of carbon black filler in the material.

The variation of physical characteristics of a material such as conductivity and/or thickness over a required range is, however, difficult to realize.

The invention disclosed and claimed in the U.S. Pat. No. 3,922,547 of Andrew P. Proudian, Murray S. Welkowsky and Steven A. Wright issued Nov. 25, 1975 has solved the problem of spatially varying the electric field configuration in a more conventional way.

According to said invention an ionographic imaging chamber for X-ray image recording contains the combination of:

- first and second substantially planar electrodes; means for mounting said electrodes in the chamber in spaced relation defining a gap therebetween; each of said electrodes having an electrical insulating substrate with a low conductivity surface at said gap and means defining a plurality of spaced locations along said surface which locations are preferably conductive concentric rings located below said surface, means for connecting a first voltage source to said first electrode providing defined voltages between said spaced locations of said first electrode;
- means for connecting a second voltage source to said second electrode providing defined voltages between said spaced locations of said second electrode; and
- means for connecting a third voltage source between said first and second electrodes for maintaining along said surfaces of said electrodes, electrostatic potentials for simulating the effect of concentric spherical metal electrodes so that extensions of the electric field lines in said gap converge substantially to a point.

The low conductivity surface at said gap is provided by means of a plate or layer of carbon impregnated epoxy that has a conductivity in the range of about $10^6$ to $10^9$ ohms per square. Said layer is applied in fluid form and cured on a non-conductive substrate carrying said conductive rings.

In the U.S. Pat. No. 3,927,322 of Teodoro Azzarelli, Eric P. Muntz and Paul B. Scott issued Dec. 16, 1975 the problem of providing a spatially varying electric field configuration to counteract geometric image unsharpness has been solved by providing an imaging chamber with substantially planar electrodes with each electrode having a spiral resistor and a low conductivity layer in contact with the resistor. The spiral resistors of the electrodes are interconnected by a third resistor across a power supply to produce at the gap surfaces electrostatic potentials which are almost the same as the electrostatic potentials of concentric spherical metal electrodes.

In the latter case each electrode may be produced by providing a metallized plastic film such as aluminized polyethylene terephthalate and etching a spiral pattern to leave a metal film spiral resistor. A film or layer of a low-conducting material is applied over the wire to provide a radial current path between the turns of the spiral.

Apart from the difficulties that arise with planar electrodes in connection with the image sharpness it has been established that these electrodes when having a smooth surface do not allow an easy separation of the electrically insulating image receiving sheet after it has been pressed in contact with such electrode under the high pressure conditions residing during the X-ray exposure in the imaging chamber.

It is one of the objects of the present invention to provide an ionographic imaging chamber containing an electrode structure which allows an easy separation of an electrically insulating sheet from the electrode surface.

In accordance with the present invention an ionographic imaging chamber comprises: first and second substantially planar electrodes; means supporting said electrodes in the chamber in spaced relation defining a gap therebetween; means for connecting a voltage source to said electrodes, and means enabling a dielectric charge receptor member to be introduced into said chamber and into contact with one of said electrodes, wherein said one electrode has in a non-porous surface layer for contacting said member a relief structure or configuration providing a recess or recesses capable of holding gas while a said charge receptor member is in position against said one electrode.

By way of example, the electrode may have at its freely exposed side (the side facing the other electrode) a multiplicity of surface protrusions or ridges for contacting a charge-receiving sheet when this is located in the chamber ready for receiving a charge pattern or image.

In certain embodiments of the invention the imaging chamber comprises:

- first and second substantially planar electrodes;
- means for mounting said electrodes in the chamber in spaced relation, defining a gap therebetween;
- means for connecting a voltage source to said electrodes, and
- means enabling a dielectric charge receptor member, e.g. sheet, to be introduced into said chamber and into contact with one of said electrodes, said one electrode having, for contacting said member, a surface layer with a relief structure or configuration providing a recess or recesses capable of holding gas while a said charge-receiving sheet is in position against said layer.

It is possible to provide for interrupted contact between the electrode and a flat charge-receiving sheet, over the whole imaging area by providing the electrode surface with a single recess or depression. For example there can be a single groove of spiral form extending over the full extent of such area. Or there may be a multiplicity of local protuberances or intersecting grooves, there being in such cases strictly only one depression because the zones around the protuberances or the grooves, as the case may be, communicate with each other. Where reference is hereafter made to recesses or depressions, this is to be taken as including the singular unless the context requires otherwise.

The recesses or other depressions of the relief structure should normally have such width and depth that the relief pattern is not or not substantially reproduced by X-ray exposure as a charge pattern on the dielectric sheet.

Preferably the recesses or other depressions in the exposed surface of the said one electrode have a depth of not more than 1 mm, and more preferably in the range of 5 to 100 microns. The width of the recesses or other depressions (which may for example have the form grooves) is preferably not more than 1 mm and is more preferably in the range of 10 to 1000 microns.

The surface relief configuration or pattern may comprise a shallow groove pattern, the grooves preferably extending to the edges of the electrode surface. The grooves may be straight, striated, curved or irregular or somewhat discontinuous, having interruptions in the form of small dotlike portions preferably free from sharp corners or angles. When the surface has a groove or grooves, various groove cross-sections can be used, e.g. curvilinear, U-shaped or V-shaped. The groove or grooves in a given surface may vary in cross-section. The grooves preferably form a grid e.g. a rectangular grid pattern, diagonal grid pattern or criss-cross groove-pattern.

In the preparation of a said surface layer preferably a dispersion of particulate electrically conductive material in a resin binder medium is used.

According to one embodiment the resin binder medium comprises a cured resin e.g. cured epoxy resin.

According to another embodiment the resin binder medium is composed of a thermoplastic resin or mixture of thermoplastic resins e.g. plasticized polyvinylchloride and low density polyethylene or mixtures of said polymers.

The desired conductivity of a said surface layer is preferably obtained with carbon particles. Generally speaking a suitable conductivity corresponds with a surface resistivity of the surface layer in the range of $10^6$ to $10^9$ ohms per square cm. When using carbon particles not only the concentration of the dispersed particles but also the structure of said particles influences the final conductivity of the layer. Carbon particles that have a hexagonal crystal structure such as graphite particles are a very good conductor for electrical current. Amorphous carbon such as lamp black is a less good conductor for electrical current. Carbon blacks having a graphite structure have a density ($g/cm^3$) substantially higher than amorphous carbon. A carbon black with density 1.8141 will give a surface resistivity $10^5$ orders lower than a carbon black of density 1.7707.

Preferred carbon blacks for preparing said surface layer in an electrode according to the present invention are listed with their trade name, density and average grain size in Table 1.

Table 1.

| No. Ref. | Carbon black (Trade name) | Density $g/cm^3$ | Average grain size (nm) |
|---|---|---|---|
| 1 | VULCAN-XC-72 | 1.8141 | 29 |
| 2 | CONDUCTEX SC | 1.8041 | 17 |
| 3 | PRINTEX-G | 1.7813 | 50 |
| 4 | PRINTEX-140 | 1.7707 | 30 |

VULCAN is a trade name of Godfrey Cabot - Boston, Mass. U.S.A.
CONDUCTEX is a trade name of Columbian Carbon Company New York, N.Y., U.S.A.
PRINTEX is a trade name of Degussa - Frankfurt/M, W-Germany.

The amount of carbon to be incorporated in a selected resin medium for obtaining a layer with surface resistivity in the range of $10^6$ to $10^9$ ohms per square cm is easily determined by test.

According to one embodiment of the manufacture of an electrode structure of the present invention an electrode surface layer having a conductivity in the range of $10^6$ to $10^9$ ohms per square cm is obtained by forming a powder layer of the thermoplastic polymer(s), wherein previously, e.g. in the melt carbon particles have been dispersed e.g. in a kneader and subjecting that powder layer to pressure whereby the powder particles are melted together.

The formation of said layer proceeds preferably directly onto an insulating foil or sheet that has at its rearside conductive material disposed for achieving a required electric field distribution, e.g. for achieving simulation of a spherical electric field as hereinbefore referred to. In the above embodiment the polymer containing already dispersed carbon may be mixed with (an) other low conductivity polymer(s) to control the conductivity and improve the mechanical properties e.g. MICROTENE FN 500 trade name for a non-pigmented polyethylene marketed by Nat. Distillers and Chem. Corp., New York, N.Y., U.S.A.

Normally the amount of dispersed carbon varies between 4 to 10 % by weight with respect to the thermoplastic resin mass.

Thermoplastic resins that have proved to yield layers with the desired conductivity and with good mechanical strength are mixtures of WEICH PVC Compound 300 or 400 being carbon black pigmented polyvinyl chloride marketed by Degussa and MICROTENE (trade name), a carbon black pigmented polyethylene marketed by Nat. Distillers and Chem. Corp., New York, N.Y. U.S.A.

In order to obtain surface conductivities in the desired range of $10^6$ to $10^9$ ohms per square cm, mixtures of 4/1 to 3/1 by weight of said polyvinyl chloride compound with said polyethylene can be used. The following Table 2 contains data of surface resistivity of polymer mixtures measured at 20° C and 50 % relative humidity.

In said Table 2 PVC Compound 300 is called polymer A and MICROTENE is called polymer B.

Table 2

| Polymer mixture A/B | Ration by weight polymer A/polymer | Surface resistivity ohms per square at 20° C and 50% relative humidity |
|---|---|---|
| 1 | 3/1 | $3.0 \times 10^9$ |
| 2 | 3.5/1 | $1.0 \times 10^8$ |
| 3 | 4/1 | $6.0 \times 10^7$ |

The layers with specified surface were formed by heating a powder layer of said polymer mixture at 100° C. and subjecting it meanwhile to a pressure of 30 kg per sq. cm. A layer of 1 mm thickness was obtained.

The measurement of the surface resistivity was performed by means of a pair of electrodes. Both electrodes being 0.3 mm thick, and having a width of 10 mm were placed on the layer surface in parallel position at a distance of 10 mm between each other. During the measurement a tension of 85 V was applied between the two electrodes.

A relief structure can be obtained in the thermoplastic surface layer by pressing a screen profile into the layer while moderately heated e.g. by contacting it in hot state under some pressure with a screened roller or plate.

According to another embodiment of the manufacture of an electrode structure of the present invention the surface layer is obtained through homogeneously dispersing carbon black in a liquid epoxy resin mixed with a curing agent, and coating and effecting the curing of the obtained dispersion on an insulating foil or sheet that has at its rearside a pattern of conductive material for electric field modification.

Epoxide resins also called epoxy resins are polyethers made by condensing epichlorohydrin with a polyhydric phenol in the presence of an alkali. The phenol is usually 2,2-bis(4-hydroxyphenyl)propane. Curing agents include thermosetting resins with methylol groups, fatty acids or acid anhydrides and amines. Amines are the preferred curing agents. The cured resins have good flexibility, adhesion, and chemical resistance.

In the preparation of a preferred electrode structure a surface layer having a very homogeneous volume resistivity throughout the entire layer due to the very homogenous dispersion of carbon black is obtained as follows:

135.8 g of polyaminoamido resin Versamid 140 (trade name for a polyamide of General Mills, U.S.A.) as curing agent and 6 g of carbon black Vulcan XC 72 (trade name) were placed in a double-walled laboratory pearl mill having a volume of 0.5 l fitted with a disk stirrer and containing quartz beads.

The content of the pearl mill was heated to 80° C and pearl milling effected to obtain a pre-mixture with a fineness of grain of NS=8 measured by means of the Hegman grind meter as specified in ASTM D 1210. The dispersion was separated from the quartz beads and cooled. This predispersion constituted the basic dispersion in the manufacture of the conductive surface layer of the electrode.

In order to obtain a surface conductivity in the range of $10^6$ to $10^9$ ohms per square cm 106.35 g of the premixture was admixed with 35 g of Versamid 140 (trade name), 53.65 g of liquid epoxy resin Epikote 162 (trade name for an epoxy resin of Shell Chemical Company U.S.A.) and 0.4 g of a 1% silicone solution in ethyl acetate. The mixture was stirred for 5 min. Subsequently, the dispersion was de-aerated by means of a vacuum pump.

The dispersion ready for coating had the following composition (expressed in percent by weight):

Epikote 162: 29.3%

Versamid 140: 68.5%

Vulcan XC 72 (trade name): 2.2%

Figure 2:
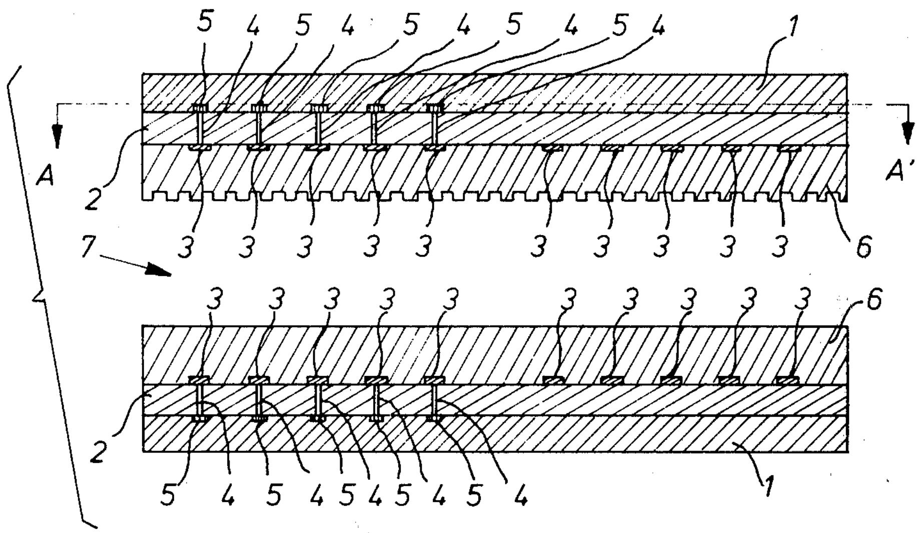

The dispersion was coated by means of a doctor knife on the electrode sheet 2 of FIG. 2 explained in detail furtheron. The thickness of the resulting layer was 1.8 mm, whereas its surface resistance after having been cured for 90 min at 80° C., was $5.5 \times 10^7$ ohms per square cm.

The surface of the obtained conductive layer was very smooth. In order to avoid the above explained difficulties with the removal of a charge receiving sheet, the surface is given a relief structure in the following way. After the conductive surface layer was applied and cured an additional coating was effected for forming a coating of 100–150 μm from a coating composition being of the same composition as that of the previous applied conductive layer. While still being in the liquid state a web or sheet material having a relief structure e.g. a polyamide cloth (nylon cloth) onto said last coating having a mesh width of 150 μm was placed. Before curing is complete e.g. after a curing period of 30 min at 80° C. the cloth was removed leaving a screen pattern behind in the conductive surface layer of the electrode. The removal of a dielectric charge receiving sheet from such layer in the ionographic imaging chamber now occurred without difficulties.

The screen structure did not show an X-ray image after processing the dielectric sheet.

The design of the ionographic imaging chamber may vary so that various of the presently known ionographic imaging chambers as described e.g. in U.S. Pat. Nos. 3,774,029 — 3,859,529 — 3,922,547 mentioned hereinbefore and 3,883,740 of Andrew P. Proudian issued May 13, 1975.

FIG. 1 of the accompanying drawings represents a schematic view of an ionographic imaging chamber without giving details about the structure of the electrodes.

Figure 3:
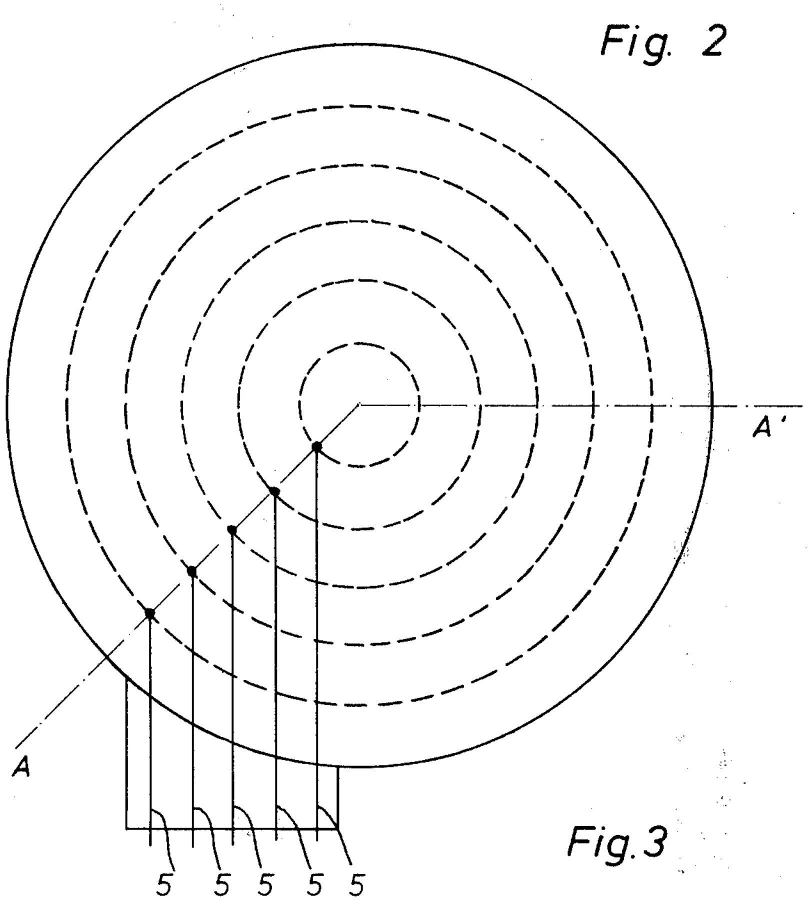

FIGS. 2 and 3 represent sectional views of an electrode combination in which details of the electrode structure are shown.

It should be understood that in these figures some relative dimensions have been greatly exaggerated to show better the details of construction.

In FIG. 1 an X-ray source 10 is positioned for directing X-rays to an object 11 which may rest on a table 12. An imaging chamber 13 carrying a dielectric receptor sheet 14 is positioned below the table, with X-rays from the source 10 passing through the object 11 and into the gas-filled gap 15 of the imaging chamber 13. The imaging chamber comprises a housing 20 with cover 21 and electrodes 22, 23 mounted therein defining the gap 15 therebetween.

Gas may be introduced into the chamber via line 28, and the electrodes 22 and 23 are connected to the power supply via cables 29 and 30.

A substantially planar electrode structure suited for use in the imaging chamber according to the present invention comprises an insulating layer or foil covered with a surface layer having a relief structure as defined and contains between said surface layer and the insulating layer or foil a pattern of conductive material of same specific conductivity which pattern provides a current path which is capable of forming in a gap between said first and second substantially planar electrode, which electrodes are both provided with such pattern of conductive material, electrostatic potentials which give rise to an electric field simulating the characteristics of a spherical field as formed between concentric spherical metal electrodes.

A preferred substantially planar electrode structure comprises in order:

an insulating layer (A), an insulating sheet (B) provided with perforations filled with electrically conductive material and having on top of it conductive concentric rings which through the conductive material of said perforations are connected separately to leads which are situated at the other side of said perforated sheet, and the perforated sheet at the side carrying the conductive rings carries the surface layer (called layer C) which has a relief structure and has a surface resistivity in the range of $10^6$ to $10^9$ ohms per square cm.

According to a preferred embodiment the material of each conductive concentric ring has the same specific conductivity. The resistivity ($\rho$) along the electrode surface between said rings varies as:

$$\rho = \rho_o (D^2/D^2)$$

$\rho$ is the resistivity of the ring with radius D, $\mu_o$ is the resistivity of the smallest ring with radius $D_o$, D is the distance between the outermost ring and the centre, and $D_o$ is the distance between the innermost ring and the centre.

In order to obtain the desired voltage differences between adjacent rings distinct voltage sources or voltage dividers e.g. resistors are interconnected between said rings.

In the accompanying FIG. 2 a cross-sectional representation of a combination of electrodes I and II for use in an imaging chamber according to the present invention is given. FIG. 3 represents a cross sectional view of the electrode I of said electrode pair over the line A—A'.

The electrodes I and II of FIG. 2 contain an insulating layer 1. On that layer 1 a perforated insulating sheet 2 is fixed. Said sheet 2 carries conductive concentric rings 3 e.g. of aluminium. These rings 3 are electrically connected via electrically conductive interconnection material 4 to leads 5 which are situated at the other side of sheet 2. The electrically conductive interconnection material 4 fills the perforations of sheet 2. The sheet 2 is at the side carrying the conductive rings 3 attached to the surface layer 6 which according to the present invention has a relief structure and comprises according to a preferred embodiment carbon particles dispersed in a cured epoxy resin in an amount sufficient to provide to said layer a surface resistivity in the range of $10^6$ to $10^9$ ohms per square cm.

The insulating layer 1 is preferably a polyethylene sheet having a thickness of 1 to 2 mm.

The sheet 2 containing perforations filled with material 4 is preferably made of polyethylene terephthalate and has a thickness of 2 mm.

The conductive rings 3 and lead strips on sheet 2 are preferably made by photo-etching. The conductors may be formed from aluminium sheets applied to opposite surfaces of sheet 2 to form a laminate. Typically the aluminium sheet can be 7 μm thick.

The width of the conductors (rings 3 and leads 5) should be minimized to avoid the conductors appearing in the final image, and typically the conductors are in the order of 250 μm wide. The interconnections between the conductors (rings 3 and leads 5) on opposite sides of sheet 2 should also be non-imaging and typically may be a carbon containing adhesive such as a mixture of lamp black and a polyester adhesive.

Between the electrodes I and II placed in an imaging chamber the gap 7 is preferably filled with an X-ray opaque gas e.g. xenon under superatmospheric pressure.

Between the leads 5 of adjacent rings voltage dividers (not shown in the drawing) may be interconnected to obtain the desired voltage changes between the rings.

The electrodes may be flat or formed in a flat position or formed to form concentric cylindrical gap surfaces. In the latter case the conductors are applied in a pattern of parallel conductor sections as shown in FIG. 4 of U.S. Pat. No. 3,922,547 mentioned hereinbefore.

When using an ionographic imaging chamber containing spherical electrodes (electrodes having a same curvature in perpendicular directions; see U.S. Pat. No. 3,828,192 mentioned hereinbefore) it is also possible to provide a releif structure an such spherical electrode contacting the charge receptor. However, this is in general not needed since normally an elastic receptor will be used, which is forced to follow the curvature of the spherical electrode. When the pressure in the ionographic chamber is reduced the elastic receptor sheet, being under elastic tension, will generally regain quickly its original form so that it is easily separated from the spherical electrode.

Imaging chambers operating with rectangular receptors are preferably operated with rectangular electrodes. The circular electrodes of present FIGS. 2 and 3 can be readily formed into the rectangular configuration (see e.g. FIGS. 2 and 8) of U.S. Pat. No. 3,922,547 mentioned hereinbefore.

We claim:

1. An ionographic imaging chamber, which comprises: a chamber housing, first and second substantially planar electrodes; means supporting said electrodes in the chamber housing in spaced relation defining a gap between the mutually facing surfaces thereof; means connecting a voltage source to said electrodes, means enabling a flexible dielectric charge receptor member to be introduced into said chamber and into contact with one of said electrodes, and means supplying pressurized gas into said chamber housing whereby said flexible member is pressed tightly against the member surface, the improvement wherein a non-porous surface layer having a surface resistivity in the range of about $10^6$ - $10^9$ ohms/cm$^2$ is disposed on the inwardly directed side of one of said electrodes, said surface layer carrying a three-dimensional pattern of grooves having a depth of at least 5 microns up to about 1000 microns and a width of about 10–1000 microns, said grooves receiving pressurized gas on the reverse side of said flexible member and facilitating separation of said member after imaging.

2. An imaging chamber according to claim 1, wherein the pattern of grooves extend to the edges of said one electrode.

3. An imaging chamber according to claim 2, wherein the grooves form a grid pattern.

4. An imaging chamber according to claim 1, wherein said surface comprises a dispersion of particulate electrically conductive material in a resin binder medium.

5. An imaging chamber according to claim 4, wherein the resin binder medium comprises a cured epoxy resin.

6. An imaging chamber according to claim 1, wherein dispersed carbon particles are present in said resin binder medium as particulate electrically conductive material.

7. An ionographic imaging chamber according to claim 1, wherein each of said electrodes comprises an insulating layer carrying a pattern of conductive material of the same specific conductivity which patterns each provide a current path wherein current is capable of forming electrostatic potentials that in the gap between said electrodes substantially correspond to the electrostatic potentials of concentric spherical metal electrodes, said pattern of conductive material of said one electrode being disposed between said grooved surface layer and said insulating layer.

8. A substantially planar electrode structure in combination with ionographic imaging chamber comprising an insulating layer covered with a non-porous surface layer having a surface resistivity in the range of about $10^6$ - $10^9$ ohms/cm$^2$, and carrying a three-dimensional pattern of grooves having a depth of at least 5 microns up to about 1000 microns and a width of about 10–1000 microns and between said surface layer and the insulating layer a pattern of conductive material of predetermined specific conductivity.

9. An electrode structure according to claim 8, wherein the surface layer comprises a dispersion of particulate electrically conductive material in a resin binder medium.

10. An electrode structure according to claim 9, wherein the resin binder medium comprises a cured epoxy resin.

11. An electrode structure according to claim 8, wherein dispersed carbon particles are present in said resin binder medium as particulate electrically conductive material.

* * * * *